US012781701B2

(12) United States Patent
Umeki et al.

(10) Patent No.: US 12,781,701 B2
(45) Date of Patent: Nov. 3, 2026

(54) COMBUSTION CONTROL APPARATUS FOR ENGINE

(71) Applicant: Mazda Motor Corporation, Aki-gun (JP)

(72) Inventors: Takumi Umeki, Aki-gun (JP); Hiroshi Okubo, Aki-gun (JP); Yusuke Okita, Aki-gun (JP)

(73) Assignee: Mazda Motor Corporation, Aki-gun (JP)

(*) Notice: Subject to any disclaimer, the term of this patent is extended or adjusted under 35 U.S.C. 154(b) by 1 day.

(21) Appl. No.: 19/222,003

(22) Filed: May 29, 2025

(65) Prior Publication Data

US 2025/0369411 A1 Dec. 4, 2025

(30) Foreign Application Priority Data

Jun. 4, 2024 (JP) ................................ 2024-090566

(51) Int. Cl.
*F02P 5/15* (2006.01)

(52) U.S. Cl.
CPC .................................. *F02P 5/1508* (2013.01)

(58) Field of Classification Search
CPC ......... F02P 5/1508; F02P 5/045; F02P 5/1502
See application file for complete search history.

(56) References Cited

U.S. PATENT DOCUMENTS

2021/0239059 A1* 8/2021 Koo ...................... F02D 41/064

* cited by examiner

*Primary Examiner* — Xiao En Mo
(74) *Attorney, Agent, or Firm* — Alleman Hall LLP

(57) ABSTRACT

A combustion control apparatus for an engine can achieve early activation of a catalyst and preferable combustion. When a catalyst temperature is less than a determination temperature, an accelerated warm-up system (AWS) control is performed in which the ignition timing is retarded, and split injection is performed in which fuel injection is divided into two or more, including one injection performed within a compression stroke, and when the actual number of injections is less than a specified number for the AWS control, a split injection abnormality is determined. When the catalyst temperature is less than the determination temperature, and when the split injection abnormality is determined, a failure-time AWS control is executed in which fuel is collectively injected within an intake stroke, and the ignition timing is advanced compared to the AWS control, and retarded compared to when the catalyst temperature is greater than or equal to the determination temperature.

16 Claims, 10 Drawing Sheets

COMBUSTION CONTROL APPARATUS FOR ENGINE

TECHNICAL FIELD

The present invention relates to a combustion control apparatus for an engine.

BACKGROUND ART

As a mode of fuel injection in an engine including a spark plug, there is known split injection in which fuel is injected into a combustion chamber in multiple divided injections. In the split injection, fuel can be dispersed by an early injection, and an air-fuel mixture with a high fuel concentration can be formed around the spark plug by a later injection and hence, it is possible to increase combustion stability.

In addition, studies have been conducted on a method for determining whether split injection is appropriately performed. For example, U.S. Pat. No. 11,352,969 discloses a method for determining whether a number of times of injection has reached a desired number of times based on the period during which a fuel injection valve is open, for example.

SUMMARY

Problems to be Solved

When the split injection is performed, and when an ignition timing is retarded in an engine in which a catalyst is provided in an exhaust passage, it is possible to achieve early activation of the catalyst by increasing the temperature of exhaust gas while deterioration of combustion stability which is caused by the retarded ignition timing is suppressed by the effect of the split injection. However, in the split injection, the fuel injection valve is repeatedly driven within a short period of time, and hence, there is a possibility that a portion of fuel injection in the split injection is not appropriately performed due to deterioration or the like of the fuel injection valve. If the split injection is not appropriately performed, a sufficient amount of fuel is not supplied into the combustion chamber, and hence, preferable combustion cannot be achieved.

The present disclosure has been made under the above-mentioned circumstances, and it is an object of the present disclosure to provide a combustion control apparatus for an engine that can achieve early activation of a catalyst, and that can preferably combust an air-fuel mixture.

Means for Solving the Problems

To solve the above-mentioned problem, the present disclosure is directed to a combustion control apparatus for an engine including an engine body, an exhaust passage, and a catalyst, the engine body having a combustion chamber, the exhaust passage being connected to the engine body, and the catalyst being disposed in the exhaust passage to purify exhaust gas. The combustion control apparatus includes a fuel injection valve that injects fuel into the combustion chamber, a spark plug that ignites an air-fuel mixture of fuel and air in the combustion chamber, and a control device that controls the fuel injection valve and the spark plug. When a temperature of the catalyst is less than a determination catalyst temperature that is predetermined, the control device performs an accelerated warm-up system (AWS) control in which an ignition timing of the spark plug is set to a timing on a retard side of an ignition timing for a case in which the temperature of the catalyst is equal to or greater than the determination catalyst temperature, and the fuel injection valve is caused to perform split injection in which fuel is injected within a period from an intake stroke to a compression stroke in divided injections for a specified number of times of two or more, including one injection performed within the compression stroke. In the AWS control, when the actual number of times of injection is equal to or less than the determination number of times of injection that is predetermined, the control device makes a determination for an occurrence of a split injection abnormality in which the split injection is not appropriately performed, the actual number of times of injection being the number of times of fuel injection performed within the period from the intake stroke to the compression stroke, the determination number of times of injection being less than the specified number of times. When the temperature of the catalyst is less than the determination catalyst temperature, and when there is the occurrence of the split injection abnormality, the control device performs a failure-time AWS control, performs a failure-time AWS control in which the fuel injection valve is caused to collectively inject fuel within the intake stroke, and the ignition timing is set to a timing on an advanced side of the timing for performing the AWS control, and on the retard side of the timing for a case in which the temperature of the catalyst is equal to or greater than the determination catalyst temperature.

According to the present disclosure, the above-mentioned AWS control is performed, and the ignition timing is set to the timing on the retard side, and hence, the temperature of exhaust gas is increased, thus increasing the temperature of the catalyst to the determination catalyst temperature or more at an early stage. Further, fuel injection is performed in divided injections for a specified number of times of two or more, including one injection performed within the compression stroke, that is, the split injection is performed, and hence, fuel can be dispersed within a wide range in the combustion chamber, and an air-fuel mixture with a high fuel concentration can be formed around the spark plug, leading to an increase in combustion stability. Accordingly, it is possible to achieve early activation of the catalyst, and preferable combustion of an air-fuel mixture.

Further, when the split injection is not appropriately performed due to the number of times of fuel injection being equal to or less than the determination number of times of injection, the failure-time AWS control is performed, and hence, the split injection is not performed, but fuel is collectively injected into the combustion chamber. In the same manner as the case of performing the AWS control, the ignition timing is set to a timing on the retard side of the ignition timing for the case in which the temperature of the catalyst is the determination catalyst temperature or more. Therefore, it is possible to promote activation of the catalyst by increasing the temperature of exhaust gas, and as a result, increasing the temperature of the catalyst while ensuring the amount of fuel to be supplied into the combustion chamber. However, in the injection mode in which fuel is collectively injected, fuel distribution obtained when the above-mentioned split injection is performed is not achieved, and hence, combustion stability is low compared with that in the split injection. As a countermeasure for this, in the failure-time AWS control, fuel is collectively injected within the intake stroke to uniformly form an air-fuel mixture in the entire combustion chamber before the ignition timing, and the ignition timing is set to a timing on the advanced side of the ignition timing for performing the AWS control. Therefore, it is possible to ensure combustion stability, and hence, also in performing the failure-time AWS control, it is possible to achieve early activation of the catalyst and preferable combustion of an air-fuel mixture.

In the above-mentioned configuration, it is preferable that each of the AWS control and the failure-time AWS control be performed when the engine body is in an idling operation.

By performing the AWS control and the failure-time AWS control as described above, it is possible to ensure combustion stability, and to promote activation of the catalyst. Therefore, with such a configuration, it is possible to promote activation of the catalyst by making use of the timing of the idling operation while ensuring combustion stability, and as a result, ensuring a preferable engine behavior, during the idling operation.

In the above-mentioned configuration, it is preferable that the engine body include a plurality of cylinders, and the control device determine whether a condition that the actual number of times of injection is equal to or less than the determination number of times of injection in a plurality of combustion cycles is respectively established for each of the plurality of cylinders, and when the condition is established for any of the plurality of cylinders, the control device makes a determination for the occurrence of the split injection abnormality, and performs the failure-time AWS control on all of the plurality of cylinders.

With such a configuration, when the condition that the combustion cycle in which the actual number of times of injection is equal to or less than the determination number of times of injection occurs is established not once but a plurality of times, a determination is made for the occurrence of the split injection abnormality, and hence, it is possible to prevent erroneous determination of the split injection abnormality. Whether the above-mentioned condition is established is respectively determined for each of the cylinders, and hence, it is possible to detect an abnormality for each of the cylinders. Further, when the above-mentioned condition is established for any one of the cylinders, a determination is made for the occurrence of the split injection abnormality, and the failure-time AWS control is performed on all cylinders. Therefore, the same combustion mode is set for all cylinders, and hence, it is possible to suppress a variation in combustion between the cylinders.

In the above-mentioned configuration, it is preferable that, in the failure-time AWS control, the control device cause a start timing of the fuel injection to be advanced more for a case in which a temperature of cooling water for cooling the engine body is low compared with a case in which the temperature of the cooling water for cooling the engine body is high.

With this configuration, when the temperature of cooling water is low, so that combustion easily becomes unstable, a long mixing period in which fuel and air are mixed is set before the ignition timing. Therefore, it is possible to promote mixing of fuel and air before the ignition timing, and hence, combustion stability can be ensured.

In the above-mentioned configuration, it is preferable that, in the failure-time AWS control, the control device causes the ignition timing to be advanced more for a case in which a temperature of cooling water for cooling the engine body is low compared with a case in which the temperature of the cooling water for cooling the engine body is high.

With such a configuration, when the temperature of cooling water is low, so that combustion easily becomes unstable, the ignition timing is set to a timing on the advanced side, and hence, it is possible to prevent deterioration of combustion stability. Further, when the temperature of cooling water is high, so that combustion stability is easily ensured, the ignition timing is set to a timing on the retard side, and hence, the temperatures of exhaust gas and the catalyst can be increased, thus further promoting activation of the catalyst.

Advantageous Effects

As has been described heretofore, according to the combustion control apparatus for an engine of the present disclosure, it is possible to achieve early activation of the catalyst, and preferable combustion of an air-fuel mixture.

DETAILED DESCRIPTION (Overall Configuration of Engine)

Figure 1:
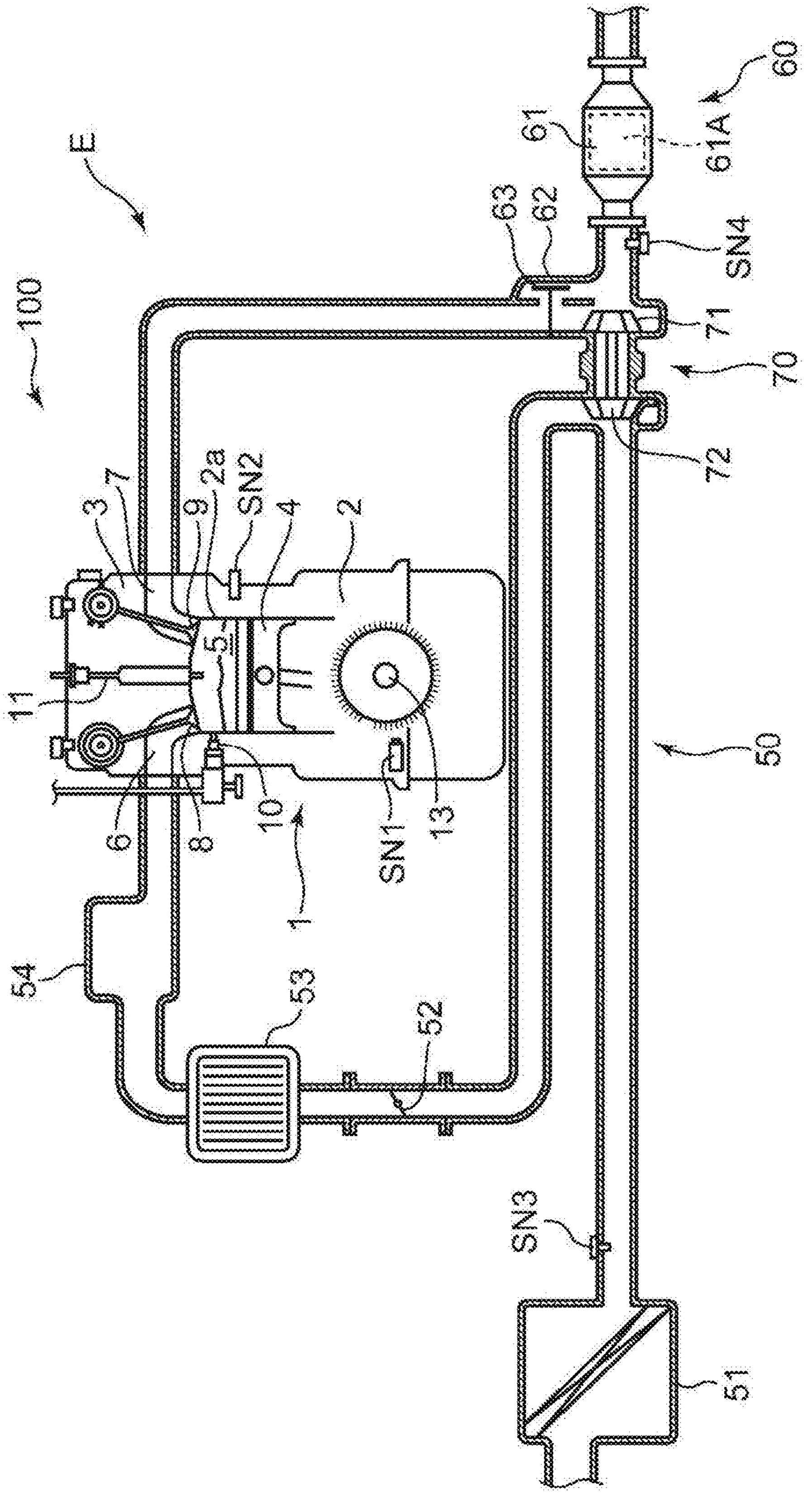
FIG. 1 is a diagram showing the configuration of an engine according to an embodiment of the present disclosure.

FIG. 1 is a schematic system diagram showing a preferred embodiment of an engine E to which a combustion control apparatus 100 according to an embodiment of the present disclosure is applied. The engine E includes an engine body 1, an intake passage 50, and an exhaust passage 60, the engine body 1 being driven by receiving a supply of fuel, the intake passage 50 and the exhaust passage 60 being connected to the engine body 1. The intake passage 50 is a passage through which intake air to be introduced into the engine body 1 flows. The exhaust passage 60 is a passage through which exhaust gas exhausted from the engine body 1 flows. The engine E is mounted in a vehicle, such as an automobile, as a traveling power source or the like for the vehicle.

The engine body 1 is a multicylinder engine including a plurality of cylinders 2*a* (only one of the plurality of cylinders 2*a* being shown in FIG. 1). In the present embodiment, the engine body 1 is a four-cylinder inline engine, and includes four cylinders 2*a* arranged in the direction orthogonal to a paper surface on which FIG. 1 is shown. The engine body 1 includes a cylinder block 2, a cylinder head 3, and a plurality of pistons 4, the plurality of cylinders 2*a* being formed in the cylinder block 2, the cylinder head 3 being attached to the upper surface of the cylinder block 2 so as to close the upper end openings of the respective cylinders 2*a*, the plurality of pistons 4 being housed in the respective cylinders 2*a* in such a way as to be reciprocatively slidable.

A combustion chamber 5 is defined in each cylinder 2*a* at a portion above the piston 4. Fuel is supplied into the combustion chamber 5 by injection from an injector 10 described later. An air-fuel mixture of the supplied fuel and air is combusted in each combustion chamber 5, and the piston 4 receives an expansion force caused by the combustion, thus performing a reciprocating motion in the up-down direction.

A crankshaft 13 being the output shaft of the engine body 1 is provided at the lower part of the cylinder block 2 (a position below the pistons 4). The crankshaft 13 is coupled to the pistons 4 in the respective cylinders 2*a* via connecting rods, and rotates about the center axis in response to the reciprocating motion (vertical motion) of the pistons 4.

A crank angle sensor SN1 and an engine water temperature sensor SN2 are attached to the cylinder block 2. The crank angle sensor SN1 detects the crank angle, being the rotation angle of the crankshaft 13, and the engine revolution speed, being the revolution speed of the crankshaft 13. The engine water temperature sensor SN2 detects the temperature of cooling water that flows through the cylinder block 2 and the cylinder head 3 to cool the engine body 1, that is, the engine water temperature sensor SN2 detects the engine water temperature. Specifically, a water jacket through which cooling water flows is formed on the inner side of each of the cylinder block 2 and the cylinder head 3, and the engine water temperature sensor SN2 detects the temperatures of cooling water flowing through the water jacket.

The cylinder head 3 has, for each cylinder 2*a*, an intake port 6 and an exhaust port 7 that communicate with the combustion chamber 5. The cylinder head 3 is provided with an intake valve 8 and an exhaust valve 9 for each cylinder 2*a*, the intake valve 8 opening/closing the opening of the intake port 6 on the combustion chamber 5 side, the exhaust valve 9 opening/closing the opening of the exhaust port 7 on the combustion chamber 5 side.

The cylinder head 3 is provided with the injector 10 and a spark plug 11 for each cylinder 2*a*. One injector 10 and one spark plug 11 are provided for each cylinder 2*a*. The injector 10 is a fuel injection valve that injects fuel into the combustion chamber 5. In the present embodiment, the injector 10 is a side injection fuel injection valve, and the distal end of the injector 10 faces the combustion chamber 5 from the inner peripheral surface of the combustion chamber 5. The spark plug 11 is an ignition device that ignites an air-fuel mixture of fuel and air, which is formed in the combustion chamber 5. In the present embodiment, the spark plug 11 is disposed such that the distal end part thereof including a spark plug faces the combustion chamber 5 from the center of the ceiling surface of the combustion chamber 5.

The intake passage 50 is connected to the cylinder head 3 in such a way as to communicate with the intake ports 6 of the respective cylinders 2*a*. The engine E in the present embodiment is an engine with a supercharger, and a compressor 72, being a part of the supercharger, is provided in the intake passage 50. An air cleaner 51 is provided in the intake passage 50 at a position upstream of the compressor 72 (in the flow direction of intake air). A throttle valve 52, an intercooler 53, and a surge tank 54 are disposed downstream of the compressor 72 in the intake passage 50 in this order from the upstream side.

The air cleaner 51 is a filter that removes foreign substances in intake air. The throttle valve 52 is a valve that opens/closes the intake passage 50. The amount of intake air flowing through the intake passage 50, and as a result, the amount of air to be introduced into the engine body 1 are changed according to the opening degree of the throttle valve 52. The compressor 72 is driven by a turbine 71 described later to supercharge intake air, that is, to increase the temperature and the pressure of intake air. The intercooler 53 cools intake air supercharged by a turbocharger 70. The surge tank 54 is a tank, and provides a space for equally distributing intake air to the respective cylinders 2*a*.

An airflow sensor SN3 is disposed in the intake passage 50. The airflow sensor SN3 is disposed in the intake passage 50 at a portion between the air cleaner 51 and the compressor 72 to detect the amount of intake air, which is the flow rate of intake air flowing through the portion.

The exhaust passage 60 is connected to the cylinder head 3 in such a way as to communicate with the exhaust ports 7 of the respective cylinders 2*a*. The turbine 71 and a catalyst converter 61 are provided to the exhaust passage 60 in this order from the upstream side. The turbine 71 is a part of the supercharger, and is driven by exhaust gas. The catalyst converter 61 is a device that purifies exhaust gas. The catalyst converter 61 includes a catalyst 61A, and purifies exhaust gas by the function of the catalyst 61A. A three-way catalyst, for example, is used for the catalyst 61A. A bypass passage 62 and a wastegate valve 63 are provided to the exhaust passage 60, the bypass passage 62 bypassing the turbine 71, the wastegate valve 63 opening/closing the bypass passage 62.

An exhaust gas temperature sensor SN4 is disposed in the exhaust passage 60. The exhaust gas temperature sensor SN4 is disposed in the exhaust passage 60 at a portion between the turbine 71 and the catalyst converter 61 to detect the temperature of exhaust gas, which is the temperature of exhaust gas passing through the portion.

(Control System)

Figure 2:
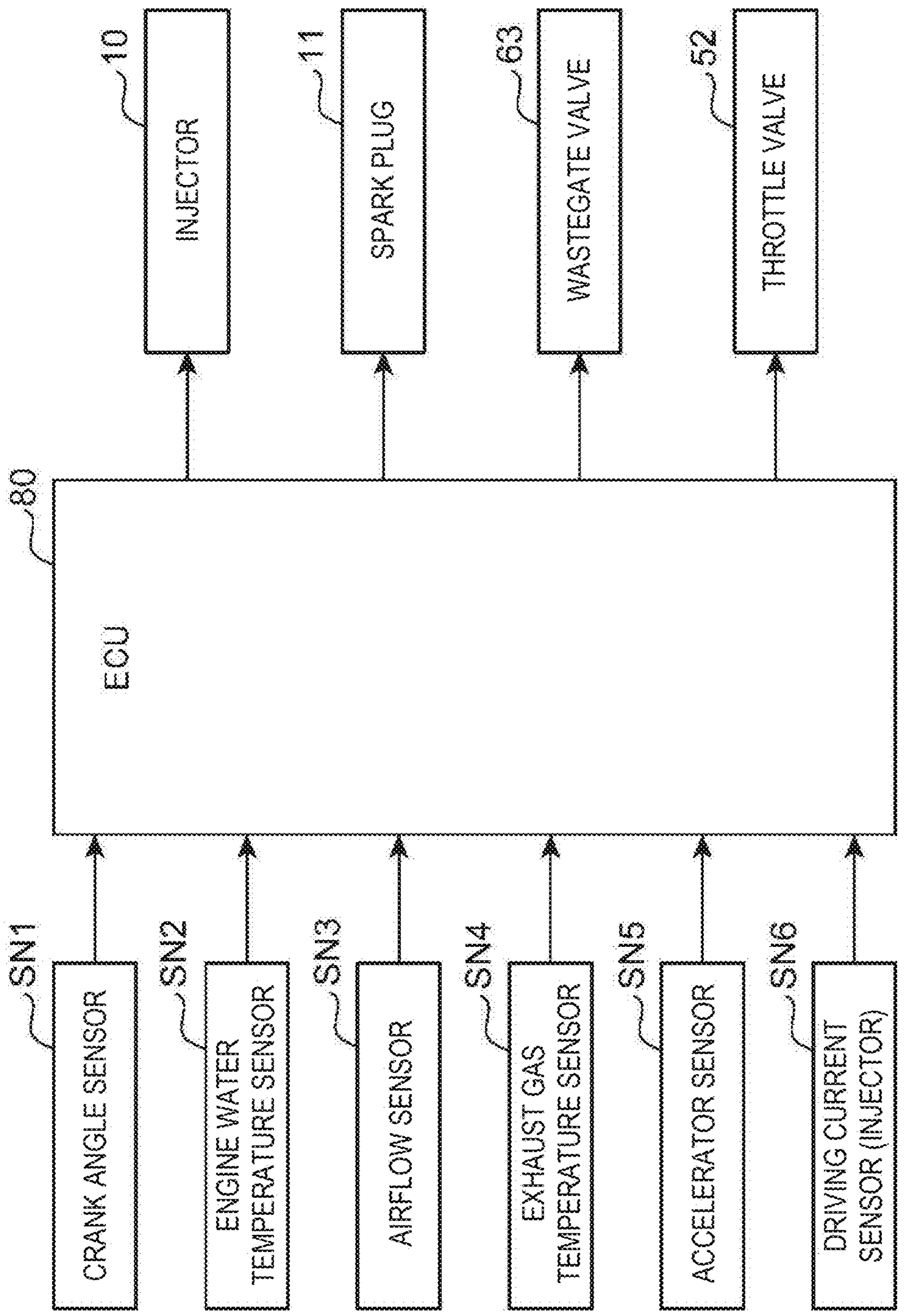
FIG. 2 is a diagram showing a control block of the engine.

FIG. 2 is a function block diagram showing the control system for the engine E. An engine control unit (ECU) 80 shown in this diagram is a device for centrally controlling the engine. The ECU 80 is a microcomputer including a processor (i.e., central processing unit (CPU)), which performs various kinds of arithmetic processing, memory, such as ROM and RAM, and various input/output buses. The ECU 80 is an example of a "control device" of the present disclosure.

The ECU 80 is electrically connected to the above-mentioned crank angle sensor SN1, engine water temperature sensor SN2, airflow sensor SN3, and exhaust gas temperature sensor SN4. An accelerator sensor SN5 that detects the accelerator opening is mounted in the vehicle, the accelerator opening being the opening degree of an accelerator pedal provided to the vehicle. The ECU 80 is also electrically connected to the accelerator sensor SN5. Each injector 10 includes a driving current sensor SN6 that detects the driving current of the injector 10. The ECU 80 is also electrically connected to the driving current sensors SN6 of the respective injectors 10.

Pieces of information detected by the respective sensors SN1 to SN6, that is, information on crank angle, engine revolution speed, the engine water temperature, the amount of intake air, the temperature of exhaust gas, accelerator opening, and the driving currents of the injectors 10, are sequentially inputted into the ECU 80.

The ECU 80 performs various determinations, arithmetic operations, and the like based on the pieces of information inputted from the above-mentioned respective sensors SN1 to SN6, and controls respective components of the engine E.

The ECU 80 is electrically connected to the injectors 10, the spark plugs 11, the throttle valve 52, and the wastegate valve 63, and outputs control signals to these pieces of equipment based on the results from the above-mentioned arithmetic operation or the like.

(AWS: Accelerated Warm-Up System)

Figure 3:
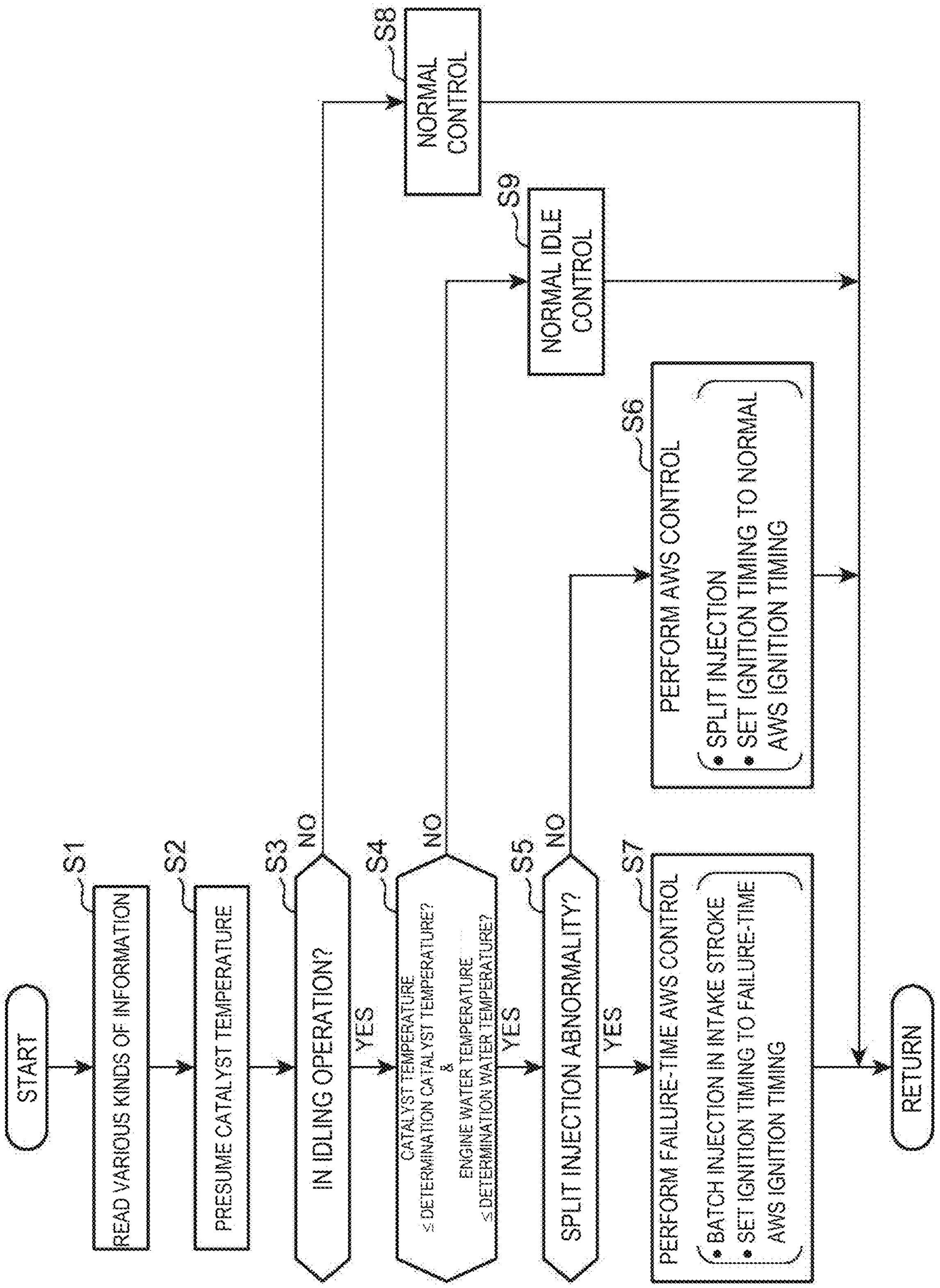
FIG. 3 is a flowchart showing the content of a control performed by a control device.

A control for activating the catalyst 61A, which is a characteristic of the present disclosure, at an early stage will be described with reference to FIG. 3. FIG. 3 is a flowchart showing the content of the control performed by the ECU 80. Steps S1 to S9 shown in FIG. 3 are repeatedly performed for each predetermined period in a state in which the engine body 1 is under operation.

First, the ECU 80 reads various kinds of information detected by the sensors SN1 to SN6 and the like (step S1). In step S1, the ECU 80 reads at least the engine revolution speed, the amount of intake air, the engine water temperature, the temperature of exhaust gas, and the accelerator opening.

Next, the ECU 80 presumes a catalyst temperature, which is the temperature of the catalyst 61A (step S2). The ECU 80 presumes the catalyst temperature based on, for example, the flow rate of exhaust gas presumed from the amount of intake air which is read in step S1, or the temperature of exhaust gas which is read in step S1. For example, a higher catalyst temperature is presumed to occur with a higher temperature of exhaust gas.

Next, the ECU 80 determines whether the engine body 1 is in an idling operation (step S3). When the engine revolution speed read in step S1 is equal to or less than an idle determination revolution speed set in advance, the ECU 80 determines that the engine body 1 is in the idling operation. The idle determination revolution speed is set in advance, and is stored in the ECU 80.

When the determination in step S3 is NO, that is, when the engine body 1 is not in the idling operation, the ECU 80 performs neither an AWS control nor a failure-time AWS control described later, but performs a normal control (step S8). In the normal control, the ECU 80 sets a target engine torque, being a target value for an engine torque, mainly based on the accelerator opening, and controls the injector 10, the throttle valve 52, and the wastegate valve 63 in such a way as to allow the target engine torque to be achieved. In the normal control, the ECU 80 sets an ignition timing to a timing in the vicinity of the MBT (Minimum Advance for Best Torque), and controls each spark plug 11 in such a way as to allow ignition to be performed at this timing. After step S8 is performed, the ECU 80 returns to step S1.

In contrast, when the determination in step S3 is YES, that is, when the engine body 1 is in the idling operation, the ECU 80 determines whether an AWS execution condition is established (step S4). The AWS execution condition is a condition that the catalyst temperature is equal to or less than a predetermined determination catalyst temperature, and that the engine water temperature is equal to or less than a predetermined determination water temperature. The determination catalyst temperature and the determination water temperature are set in advance and are stored in the ECU 80. The determination catalyst temperature is set to approximately 400° C., for example, and the determination water temperature is set to approximately 45°. The ECU 80 performs the determination in step S4 based on the engine water temperature read in step S1, and based on the catalyst temperature presumed in step S2.

When the determination in step S4 is NO, that is, when the AWS execution condition is not established due to the catalyst temperature being higher than the determination catalyst temperature, or due to the engine water temperature being higher than the determination water temperature, the ECU 80 performs neither the AWS control nor the failure-time AWS control, but performs a normal idle control (step S9). In the normal idle control, the ECU 80 controls the injector 10, the throttle valve 52, and the wastegate valve 63 in such a way as to allow the engine revolution speed to be maintained in the vicinity of an idle revolution speed that is set to a value higher than the idle determination revolution speed. In the normal idle control, in the same manner as the normal control, the ECU 80 sets the ignition timing to a timing in the vicinity of the MBT, and controls the spark plug 11 in such a way as to cause ignition to be performed at this timing. After step S9 is performed, the ECU 80 returns to step S1.

In contrast, when the determination in step S4 is YES, that is, when the AWS execution condition is established due to the catalyst temperature being equal to or less than the determination catalyst temperature, and due to the engine water temperature being equal to or less than the determination water temperature, the ECU 80 determines whether there is an occurrence of an abnormality in split injection (step S5). The details of the determination of an abnormality in split injection will be described later.

Figure 4:
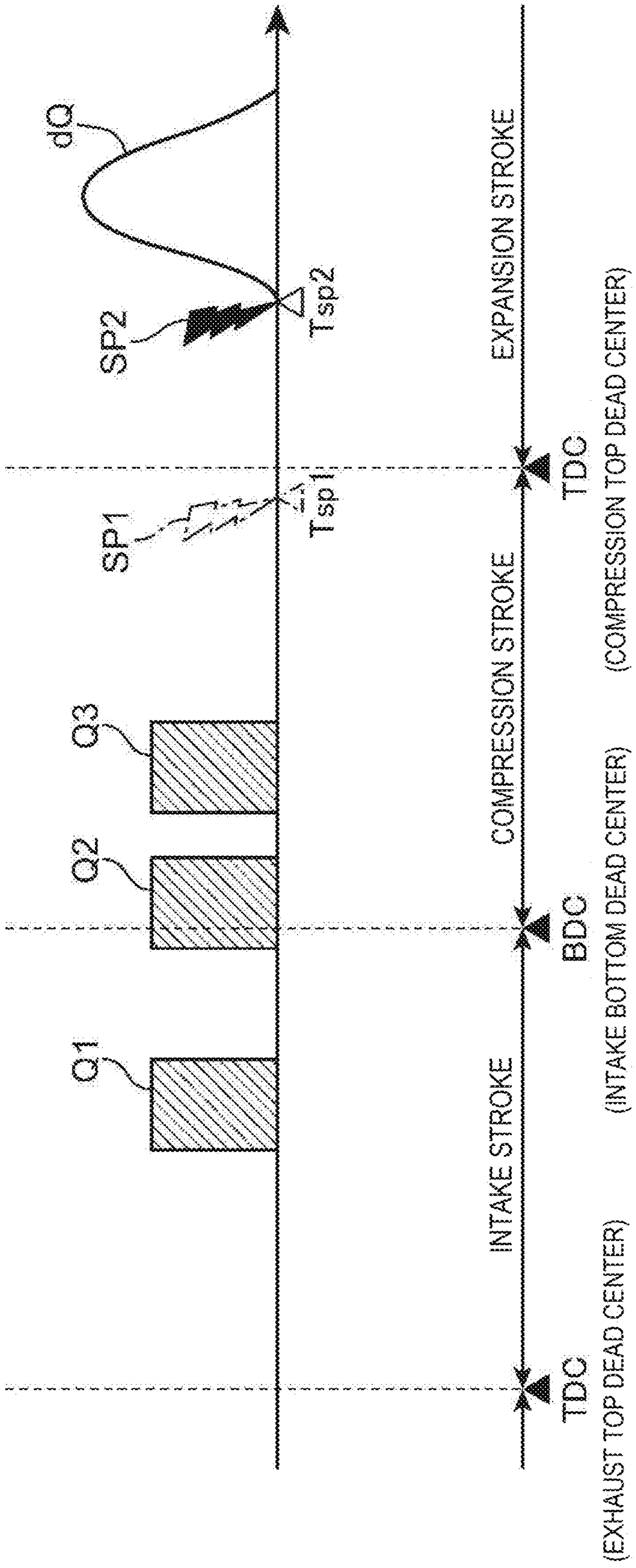
FIG. 4 is a diagram showing fuel injection timings, ignition timings, and a combustion waveform for performing a normal accelerated warm-up system (AWS) control.

When the determination in step S5 is NO, that is, when it is not determined that the split injection is abnormal, the ECU 80 performs the AWS control (step S6). FIG. 4 is a diagram schematically showing fuel injections, ignition timings, and a combustion waveform (dQ) for performing the AWS control in the present embodiment.

In the AWS control, the split injection is performed. Specifically, the ECU 80 controls the injector 10 such that fuel is injected into the combustion chamber 5 in multiple divided injections, that is, in the commanded number of times set to a value equal to or greater than two, within the period from the intake stroke to the compression stroke, that is, within the period from the exhaust top dead center to the compression top dead center. The ECU 80 also controls the injector 10 such that at least a portion of the multiple divided fuel injections is performed within the compression stroke. This commanded number of times of injection corresponds to "specified number of times" of the present disclosure.

As shown in FIG. 4, in the present embodiment, the commanded number of times of injection is three, and when the AWS control is performed, fuel is injected into the combustion chamber 5 in three divided injections. Each of the injection start timing and the injection end timing of a first injection Q1, which is performed first, is set at a timing within the intake stroke. The injection start timing and the injection end timing of a second injection Q2, which is performed next, are respectively set at a timing within the intake stroke and at a timing within the compression stroke. Both the injection start timing and the injection end timing of a third injection Q3, which is performed last, are set at timings within the compression stroke. As described above, in the present embodiment, a portion of the second injection Q2, and the third injection Q3 are performed within the compression stroke. Note that in the present embodiment, the injector 10 is controlled such that the same amount of fuel is injected into the combustion chamber 5 by each of the first injection Q1, the second injection Q2, and the third injection Q3.

In performing the AWS control, the ECU 80 sets the ignition timing to a normal AWS ignition timing Tsp2, being an ignition timing for the AWS control, and controls the spark plug 11 in such a way as to cause ignition to be performed at this normal AWS ignition timing Tsp2. The normal AWS ignition timing Tsp2 is a timing on the retard side of the compression top dead center (TDC). The normal AWS ignition timing Tsp2 is the timing on the retard side of the ignition timing for performing the normal idle control or the normal control, and when the AWS control is performed, an air-fuel mixture is ignited (SP2) at a timing on the retard side of ignition (SP1) for performing the normal idle control or the normal control. To be more specific, the normal AWS ignition timing Tsp2 is the timing on the retard side of a timing (Tsp1) with the maximum retard, of the ignition timings set for performing the normal idle control or the normal control. In the present embodiment, the normal AWS ignition timing Tsp2 is changed according to charging efficiency within the range on the retard side of the compression top dead center, and on the retard side of the ignition timing for performing the normal idle control or the normal control. Hereinafter, the ignition timing for performing the normal idle control or the normal control is referred to as "normal ignition timing" when appropriate.

The above-mentioned normal AWS control is performed on all cylinders 2*a*. That is, when the normal AWS control is performed, the split injection is performed in all cylinders 2*a*, and the ignition timing is set to the normal AWS ignition timing Tsp2 in all cylinders 2*a*. After step S6 is performed, the ECU 80 returns to step S1.

Figure 5:
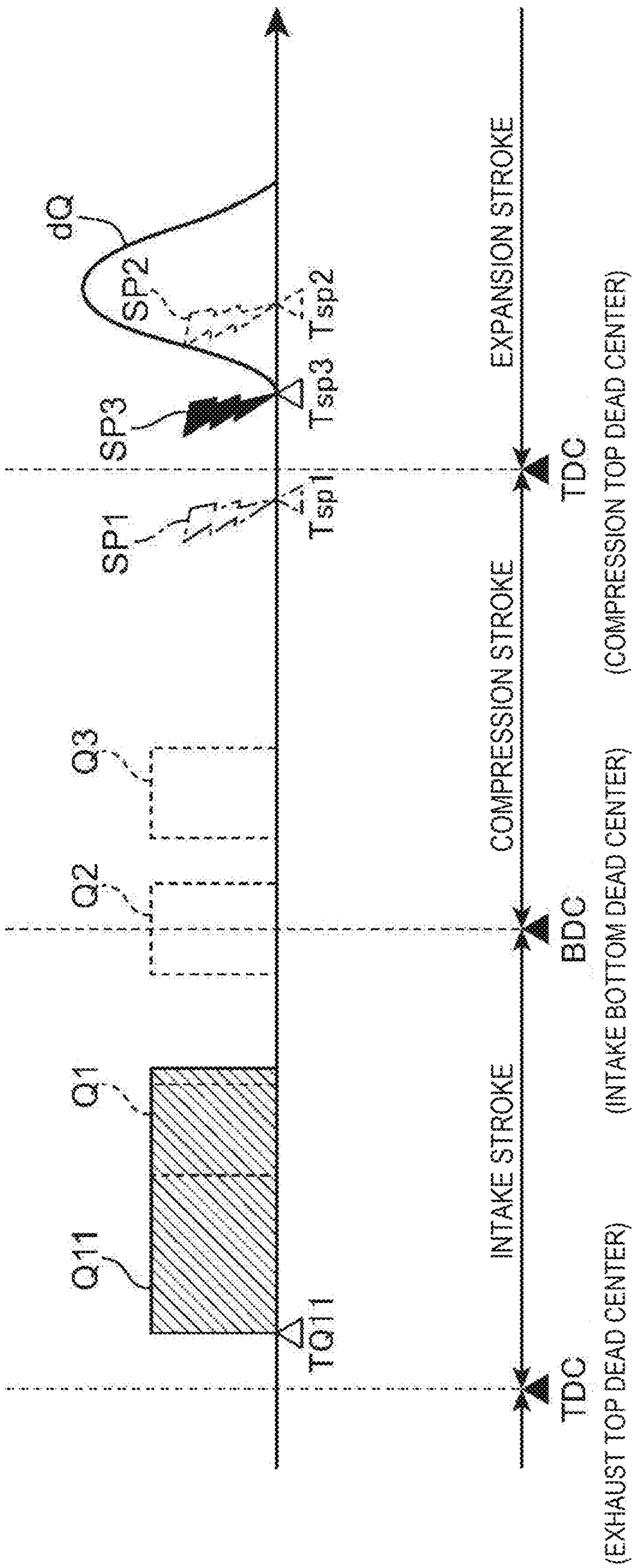
FIG. 5 is a diagram showing fuel injection timings, ignition timings, and a combustion waveform for performing a failure-time AWS control.

Returning to step S5, when the determination in step S5 is YES, that is, when it is determined that the split injection is abnormal, the ECU 80 performs the failure-time AWS control (step S7). FIG. 5 is a diagram schematically showing fuel injection timings, ignition timings, and a combustion waveform (dQ) for performing the failure-time AWS control in the present embodiment.

In the failure-time AWS control, a batch injection Q11 is performed. Specifically, when the failure-time AWS control is performed, the ECU 80 controls the injector 10 such that all fuel to be injected into the combustion chamber 5 in one combustion cycle is collectively injected within the intake stroke. Note that the total amount of fuel injected into the combustion chamber 5 in one combustion cycle for performing the failure-time AWS control is substantially equal to the total amount of fuel injected into the combustion chamber 5 in one combustion cycle for performing the normal AWS control. Broken lines Q1 to Q3 in FIG. 5 show fuel injections for performing the normal AWS control. As can be understood from this comparison between the broken lines and the solid line, a start timing TQ11 of the fuel injection Q11 for performing the failure-time AWS control is set to a timing on the advanced side of the start timing of the initial fuel injection (the first injection Q1) for performing the AWS control. Hereinafter, the start timing TQ11 of the fuel injection Q11 for performing the failure-time AWS control is referred to as "fuel injection start timing TQ11 for performing the failure-time AWS control" when appropriate.

In performing the failure-time AWS control, the ECU 80 sets the ignition timing to a failure-time AWS ignition timing Tsp3, being an ignition timing for the failure-time AWS control, and controls the spark plug 11 in such a way as to cause ignition to be performed at this failure-time AWS ignition timing Tsp3. In the same manner as the normal AWS ignition timing Tsp2, the failure-time AWS ignition timing Tsp3 is a timing on the retard side of the compression top dead center (TDC), and on the retard side of the normal ignition timing Tsp1. However, the failure-time AWS ignition timing Tsp3 is set to a timing on the advanced side of the normal AWS ignition timing Tsp2. That is, when the failure-time AWS control is performed, an air-fuel mixture is ignited (SP3) at a timing on the retard side of the compression top dead center, on the retard side of the ignition (SP1) for performing the normal idle control or the normal control, and on the advanced side of the ignition (SP2) for performing the AWS control.

Figure 6:
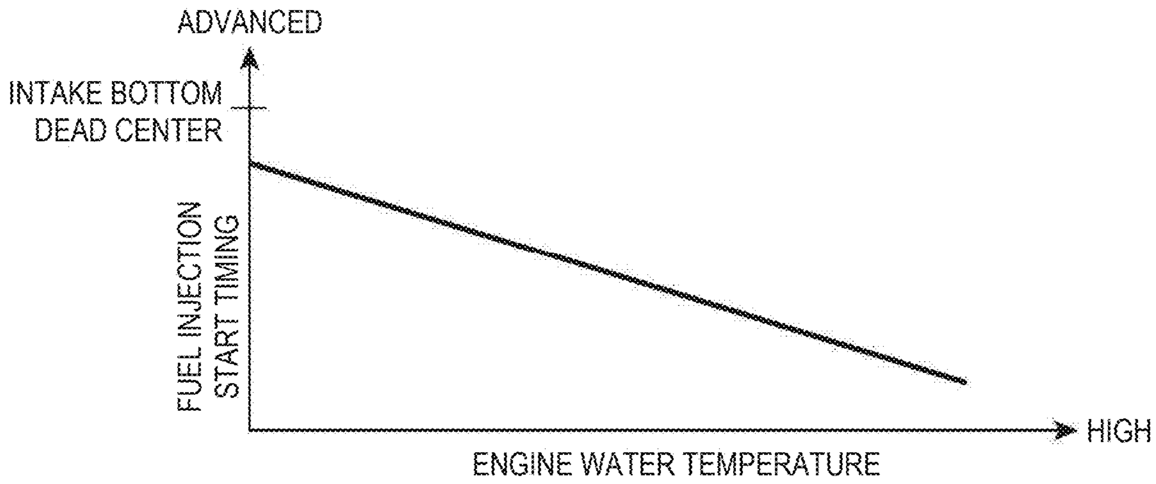
FIG. 6 is a graph showing the relationship between engine water temperature and start timing of fuel injection for performing the failure-time AWS control.

In the present embodiment, the fuel injection start timing TQ11 for performing the failure-time AWS control is set to a more advanced timing for the case in which the engine water temperature is low compared with the case in which the engine water temperature is high. FIG. 6 is a graph showing the relationship between fuel injection start timing TQ11 for performing the failure-time AWS control and engine water temperature in the present embodiment. As shown in FIG. 6, in the present embodiment, the fuel injection start timing TQ11 for performing the failure-time AWS control is set to a more advanced timing for a lower engine water temperature.

Figure 7:
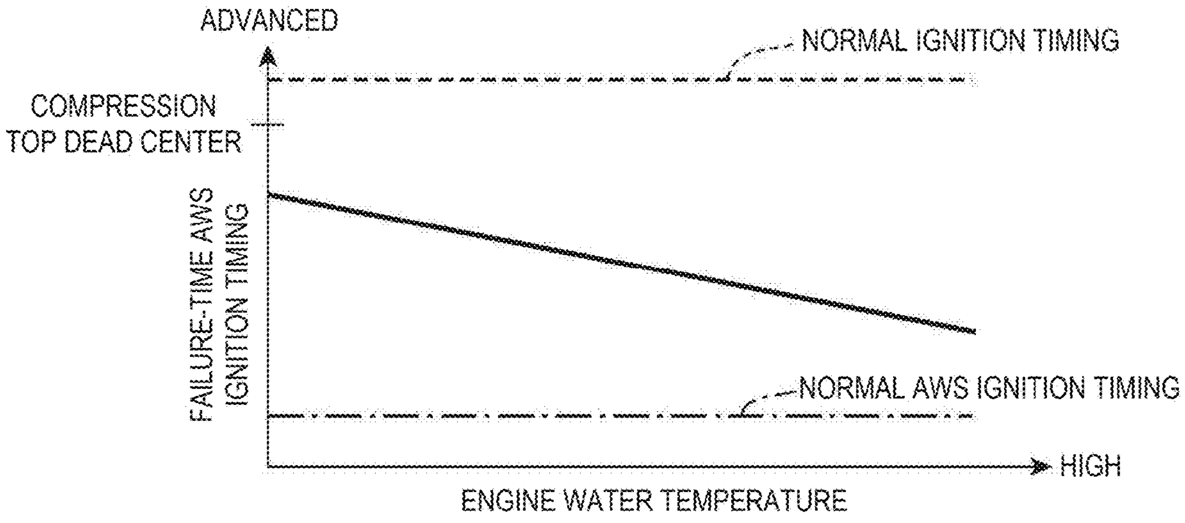
FIG. 7 is a graph showing the relationship between engine water temperature and ignition timing for performing the failure-time AWS control.

In the present embodiment, the failure-time AWS ignition timing Tsp3 is changed according to charging efficiency within a range on the retard side of the compression top dead center, on the retard side of the normal ignition timing Tsp1, and on the advanced side of the normal AWS ignition timing Tsp2. Further, the failure-time AWS ignition timing Tsp3 is set to a more advanced timing for the case in which the engine water temperature is low compared with the case in which the engine water temperature is high. FIG. 7 is a graph showing the relationship between failure-time AWS ignition timing Tsp3 and engine water temperature in the present embodiment. As shown in FIG. 7, in the present embodiment, the failure-time AWS ignition timing Tsp3 is set to a more advanced timing for a lower engine water temperature. To be more specific, under the condition of the same charging efficiency, the failure-time AWS ignition timing Tsp3 is set to a more advanced timing for a lower engine water temperature.

The above-mentioned failure-time AWS control is performed on all cylinders 2*a*. That is, when the failure-time AWS control is performed, the batch injection Q11 is performed in all cylinders 2*a*, and the ignition timing is set to the failure-time AWS ignition timing Tsp3 in all cylinders 2*a*. After step S6 is performed, the ECU 80 returns to step S1.

Figure 8:
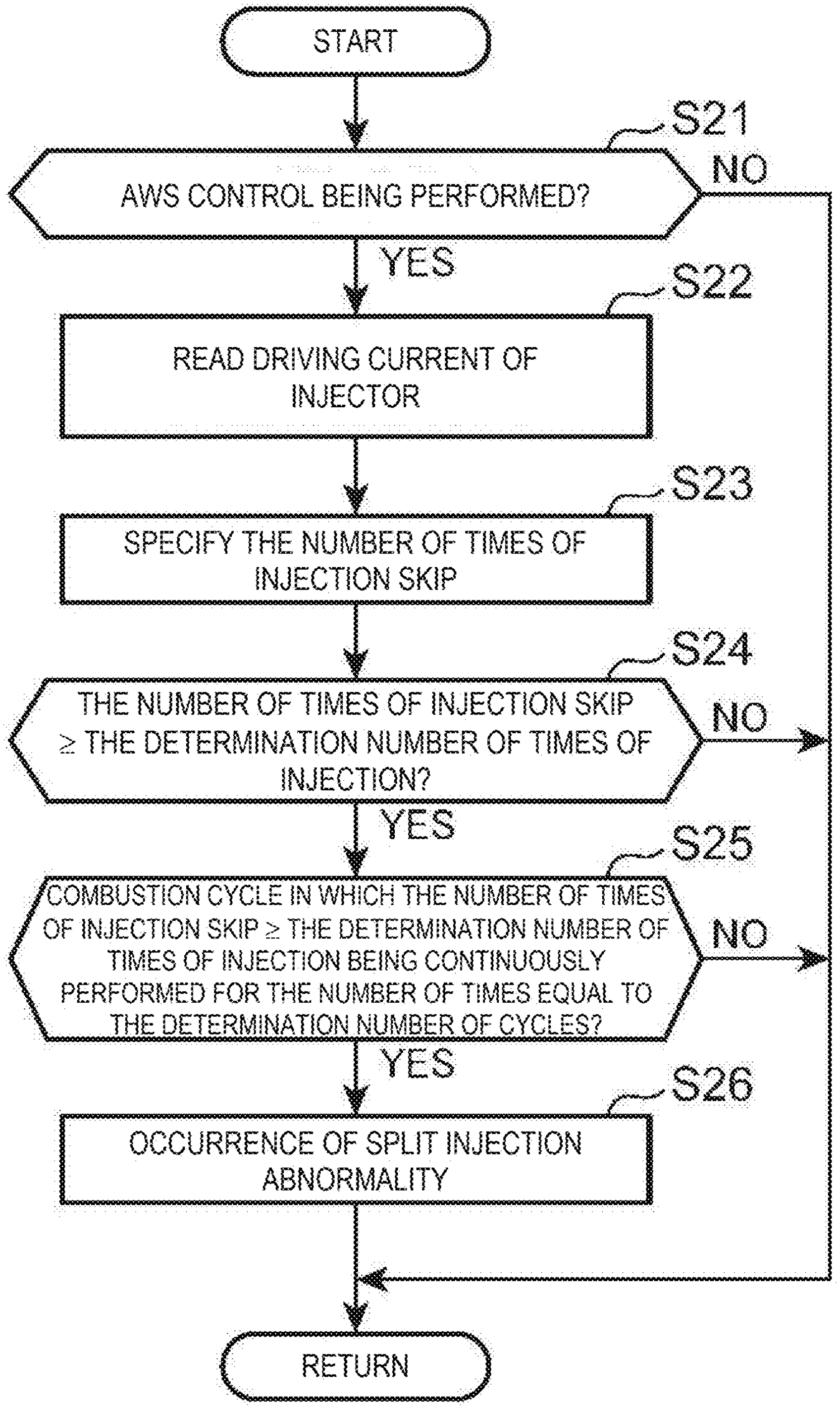
FIG. 8 is a flowchart showing the procedure for determining an abnormality in split injection.

Next, the detail of determination of an abnormality in the split injection (step S5) will be described. FIG. 8 is a flowchart showing the content of the determination, which is performed by the ECU 80, on an abnormality in the split injection. Steps S21 to S26 shown in FIG. 8 are individually performed for each cylinder 2*a*, and are repeatedly performed for each combustion cycle of each cylinder 2*a*. Steps S21 to S25 shown in FIG. 8 are performed when it is determined that the split injection is not abnormal. That is, once it is determined that the split injection is abnormal, this determination is not made.

First, the ECU 80 determines whether the AWS control is being performed (step S21). When this determination is NO, that is, when the AWS control is not being performed, the process is ended with no further processing, and the process returns to step S21.

Figure 9:
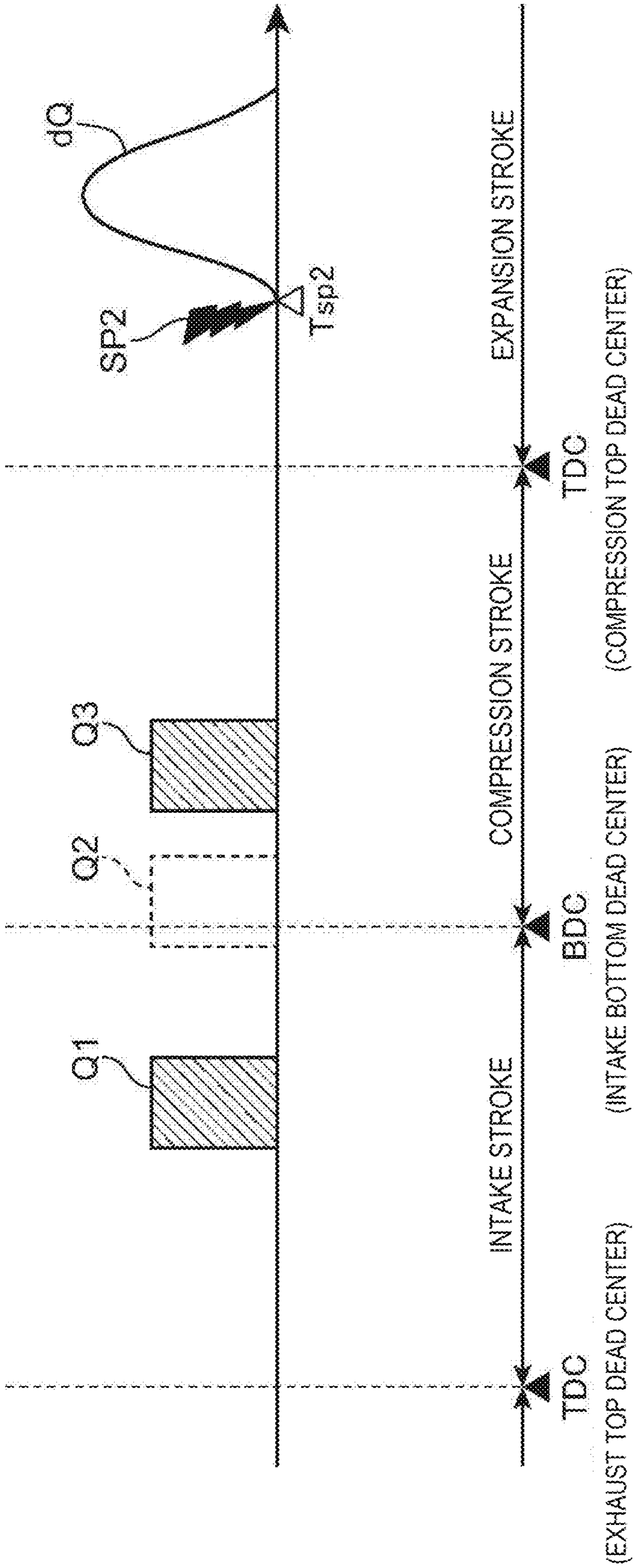
FIG. 9 is a diagram for describing the number of times of injection skip, FIG. 9 corresponding to FIG. 4.

In contrast, when the determination in step S21 is YES, that is, when the AWS control is being performed, the ECU 80 reads the driving current of the injector 10 detected by the driving current sensor SN6 (step S22). Next, the ECU 80 specifies the number of times of injection skip (step S23). The number of times of injection skip is the number of times of fuel injection that is not actually performed, of the commanded number of times of fuel injection that the injector 10 is commanded by the ECU 80 to perform within one combustion cycle. In the present embodiment, as described above, the commanded number of times of injection is three, and the injector 10 is controlled in such a way as to perform three fuel injections Q1 to Q3. However, when the second injection Q2 is not actually performed as shown in FIG. 9, the number of times of injection skip is set to "1." Further, when neither the first injection Q1 nor the second injection Q2 is performed, the number of times of injection skip is set to "2."

The number of times of injection skip is specified based on the driving current of the injector 10 read in step S22. Specifically, when the injector 10 is driven, and fuel injection is actually performed, the driving current rises above a predetermined value. In view of the above, the ECU 80 specifies the number of times at which the driving current of the injector 10 rises above the predetermined value within one combustion cycle as the actual number of times of injection being the number of times at which fuel injection is actually performed. Then, the ECU 80 specifies the difference between the actual number of times of injection and the commanded number of times of injection as the number of times of injection skip.

Next, the ECU 80 determines whether the specified number of times of injection skip is equal to or greater than the predetermined determination number of times of injection (step S24). The determination number of times of injection is set in advance to a value that is smaller than the commanded number of times of injection and that is one or more, and the determination number of times of injection is stored in the ECU 80. In the present embodiment, the determination number of times of injection is set to "1."

When the determination in step S24 is NO, that is, when the number of times of injection skip is less than the determination number of times of injection, the ECU 80 ends the process with no further processing (returns to step S21).

In contrast, when the determination in step S24 is YES, that is, when the number of times of injection skip is equal to or greater than the determination number of times of injection, the ECU 80 determines whether a combustion cycle, in which the number of times of injection skip is equal to or greater than the determination number of times of injection, is continuously performed for the number of times equal to or greater than the determination number of cycles (step S25). That is, the ECU 80 determines whether the number of times of injection skip is equal to or greater than the determination number of times of injection within the period from a combustion cycle before the determination number of cycles to the current combustion cycle. The determination number of cycles is set in advance, and is stored in the ECU 80. In the present embodiment, the determination number of cycles is set to 2, and it is determined whether a combustion cycle, in which the number of times of injection skip is equal to or greater than the determination number of times of injection, is continuously performed two times.

When the determination in step S25 is NO, that is, when the combustion cycle, in which the number of times of injection skip is equal to or greater than the determination number of times of injection, is not continuously performed, or when the number of combustion cycles continued does not reach the determination number of cycles, the ECU 80 ends the process with no further processing (returns to step S21).

In contrast, when the determination in step S25 is YES, that is, when the number of combustion cycles continued reaches the determination number of cycles, the ECU 80 determines that there is an occurrence of a split injection abnormality, in which the split injection is not normally performed, and the ECU 80 ends the process.

As described above, steps S21 to S25 are individually performed for each cylinder 2*a*, and when the determination in step S24 for any cylinder 2*a* is YES, the ECU 80 determines that there is an occurrence of a split injection abnormality.

(Operation, Etc.)

In the above-mentioned embodiment, when the catalyst temperature is less than the catalyst determination temperature, the AWS control is performed, and the ignition timing is set to the normal AWS ignition timing Tsp2, which is on the retard side of the normal ignition timing Tsp1. Consequently, the air-fuel mixture is combusted at a more retarded timing and hence, it is possible to increase the temperature of exhaust gas introduced into the exhaust passage 60 from the combustion chamber 5, and as a result, it is possible to increase the temperature of the catalyst 61A. However, when the ignition timing is set to a timing on the retard side, combustion stability is deteriorated. As a countermeasure for this, in the AWS control, fuel is injected into the combustion chamber 5 in multiple divided injections, and fuel injection is performed within the compression stroke. Therefore, the air-fuel mixture in the combustion chamber 5 can be stratified. Specifically, fuel can be dispersed within a wide range in the combustion chamber 5, and an air-fuel mixture with a high fuel concentration can be formed around the spark plug 11. Therefore, it is possible to more surely cause generation and growth of an initial flame, thus increasing combustion stability. Accordingly, according to the above-mentioned embodiment, by performing the AWS control, it is possible to promote activation of the catalyst 61A while combustion stability is ensured, that is, preferable combustion of an air-fuel mixture is achieved.

In the above-mentioned embodiment, when the AWS control is performed, and when the actual number of times of injection is smaller than the determination number of times of injection, that is, when there is a high possibility of the split injection not being appropriately performed, it is determined that there is an occurrence of a split injection abnormality. Then, when the catalyst temperature is less than the catalyst determination temperature, and when there is an occurrence of a split injection abnormality, the failure-time AWS control is performed, so that fuel is collectively injected into the combustion chamber 5. Therefore, compared with the case in which the split injection is performed, it is possible to supply an appropriate amount of fuel into the combustion chamber 5 more surely. In the same manner as the case of performing the AWS control, also when the failure-time AWS control is performed, the ignition timing is set to a timing on the retard side of the ignition timing for a case in which the temperature of the catalyst is equal to or greater than the determination catalyst temperature. Therefore, it is possible to increase the temperature of the catalyst 61A.

However, in the injection mode in which fuel is collectively injected, the concentration of an air-fuel mixture around the spark plug is low at the ignition timing compared with that in the split injection and hence, there is a high possibility of an initial flame failing to be generated and to grow appropriately. That is, the injection mode in which fuel is collectively injected has a lower combustion stability than the split injection. As a countermeasure for this, in the failure-time AWS control, the ignition timing is set to a timing on the advanced side of the ignition timing for performing the AWS control. Therefore, it is possible to appropriately cause generation and growth of an initial flame. Further, in the failure-time AWS control, fuel is collectively injected within the intake stroke and hence, it is possible to achieve preferable flame propagation by uniformly forming an air-fuel mixture in the entire combustion chambers 5 before the ignition timing. Accordingly, also when the failure-time AWS control is performed, it is possible to ensure combustion stability while achieving early activation of the catalyst.

In the above-mentioned embodiment, the normal AWS control or the failure-time AWS control is performed during the idling operation. Therefore, it is possible to promote activation of the catalyst 61A by making use of the timing of the idling operation while ensuring combustion stability, and as a result, ensuring an engine behavior, during the idling operation.

In the above-mentioned embodiment, when a combustion cycle, in which the actual number of times of injection is equal to or less than the determination number of times of injection, occurs a plurality of times in the same cylinder 2*a*, it is determined that there is a split injection abnormality. Therefore, it is possible to avoid a situation in which an occurrence of split injection abnormality is erroneously determined immediately after it is determined that the actual number of times of injection is equal to or less than the determination number of times of injection due to incidental noise or the like. As described above, according to the above-mentioned embodiment, it is possible to more appropriately determine whether there is an occurrence of a split injection abnormality.

In the above-mentioned embodiment, when the failure-time AWS control is performed, the control is performed on all cylinders 2*a*. That is, the ignition timing is set to the failure-time AWS ignition timing Tsp3 in all cylinders 2*a*, and fuel is collectively injected within the intake stroke in all cylinders 2*a*. Therefore, it is possible to avoid a situation in which a variation occurs in combustion due to the difference in combustion mode between the cylinders 2*a*.

In the above-mentioned embodiment, the fuel injection start timing TQ11 for performing the failure-time AWS control is set to a more advanced timing for the case in which the engine water temperature is low compared with the case in which the engine water temperature is high. That is, when the failure-time AWS control is performed, and when the engine water temperature is low, so that combustion easily becomes unstable, a long mixing period in which fuel and air are mixed is set before the ignition timing. Therefore, it is possible to promote mixing of fuel and air before the ignition timing and hence, combustion stability can be ensured.

In the above-mentioned embodiment, the failure-time AWS ignition timing Tsp3 is set to a more advanced timing for the case in which the engine water temperature is low compared with the case in which the engine water temperature is high. That is, when the engine water temperature is low, so that combustion easily becomes unstable, the ignition timing is set to a timing on the advanced side. Therefore, it is possible to ensure combustion stability. In contrast, when the engine water temperature is high, so that combustion stability is easily ensured, the ignition timing is set to a timing on the retard side and hence, the temperatures of exhaust gas and the catalyst 61A are increased, thus promoting activation of the catalyst 61A.

Modification

Although the description has been made, in the above-mentioned embodiment, for the case in which fuel is injected into the combustion chamber 5 in three divided injections when the normal AWS control is being performed, the number of times of fuel injection is not limited to three times.

In the above-mentioned embodiment, the description has been made for the case in which a determination is made for an occurrence of a split injection abnormality when a combustion cycle, in which the number of times of injection skip is equal to or greater than the determination number of times of injection, is continuously performed for the number of times equal to or greater than the determination number of cycles. However, instead of such a configuration, a determination may be made for an occurrence of a split injection abnormality when the number of combustion cycles in which the number of times of injection skip is equal to or greater than the determination number of times of injection is equal to or greater than the determination number of cycles. That is, not the number of times of continuation of the combustion cycle, in which the number of times of injection skip is equal to or greater than the determination number of times of injection, but the total number of the combustion cycles in which the number of times of injection skip is equal to or greater than the determination number of times of injection may be used for the above-mentioned determination. Irrespective of the number of combustion cycles, the determination may be made for the occurrence of a split injection abnormality at a point in time when the number of times of injection skip becomes equal to or greater than the determination number of times of injection.

Figure 10:
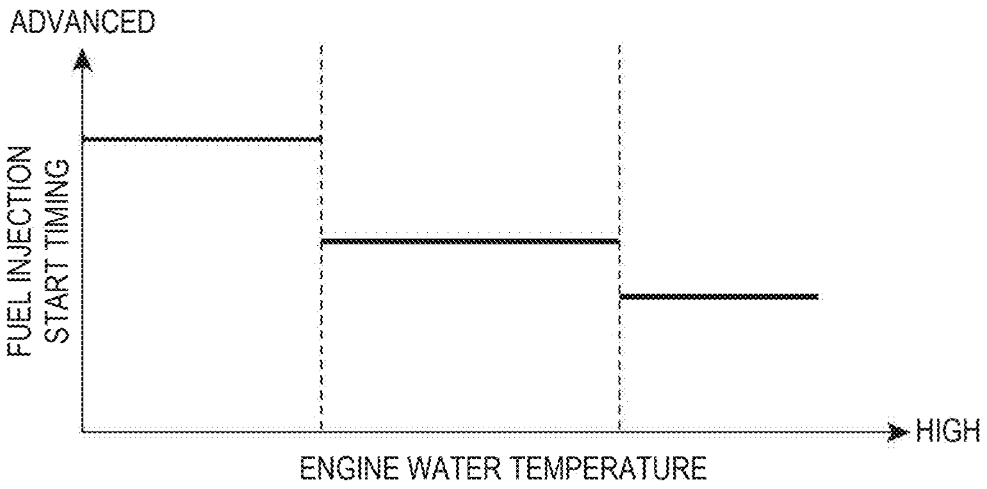
FIG. 10 is a graph showing another example of the relationship between engine water temperature and ignition timing for performing the failure-time AWS control.

In the above-mentioned embodiment, the description has been made for the case in which the fuel injection start timing TQ11 for performing the failure-time AWS control is set to a more advanced timing for a lower engine water temperature. However, instead of such a configuration, this fuel injection start timing may be set as shown in FIG. 10. Specifically, when the engine water temperature falls within a predetermined range, the same fuel injection start timing may be set irrespective of the engine water temperature, and a more advanced fuel injection start timing may be set for a range with lower engine water temperatures. Further, the same fuel injection start timing may be set irrespective of the engine water temperature. Regarding the failure-time AWS ignition timing Tsp3, in the same manner, when the engine water temperature falls within a predetermined range, the same failure-time AWS ignition timing Tsp3 may be set irrespective of the engine water temperature, and a more advanced failure-time AWS ignition timing Tsp3 may be set for the range with lower engine water temperatures. Further, the same failure-time AWS ignition timing Tsp3 may be set irrespective of the engine water temperature.

Specific values for the above-mentioned determination catalyst temperature, determination water temperature, the determination number of times of injection, and the determination number of cycles are not limited to the above-mentioned values.

In the above-mentioned embodiment, the description has been made for the case in which a determination of whether the number of times of injection skip is equal to or greater than the determination number of times of injection is made by using the detected value from the driving current sensor SN6, which is included in the injector 10. However, the specific procedure of this determination is not limited to the above-mentioned procedure.

The specific structure, such as the number of cylinders of the engine body 1, is not limited to the above-mentioned structure.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTER LIST

1 engine body
2*a* cylinder
5 combustion chamber
10 injector (fuel injection valve)
11 spark plug
61A catalyst
80 ECU (control device)

What is claimed is:

1. A combustion control apparatus for an engine including an engine body, an exhaust passage, and a catalyst, the engine body having a combustion chamber, the exhaust passage being connected to the engine body, the catalyst being disposed in the exhaust passage to purify exhaust gas, the combustion control apparatus comprising:

a fuel injection valve that injects fuel into the combustion chamber;

a spark plug that ignites an air-fuel mixture of fuel and air in the combustion chamber; and a control device that controls the fuel injection valve and the spark plug, wherein when a temperature of the catalyst is less than a determination catalyst temperature that is predetermined, the control device performs an accelerated warm-up system (AWS) control in which an ignition timing of the spark plug is set to a timing on a retard side of an ignition timing for a case in which the temperature of the catalyst is equal to or greater than the determination catalyst temperature, and the fuel injection valve is caused to perform split injection in which fuel is injected within a period from an intake stroke to a compression stroke in divided injections for a specified number of times of two or more, including one injection performed within the compression stroke, in the AWS control, when an actual number of times of injection is equal to or less than a determination number of times of injection that is predetermined, the control device makes a determination for an occurrence of a split injection abnormality in which the split injection is not appropriately performed, the actual number of times of injection being the number of times of fuel injection performed within the period from the intake stroke to the compression stroke, the determination number of times of injection being less than the specified number of times, and when the temperature of the catalyst is less than the determination catalyst temperature, and when there is the occurrence of the split injection abnormality, the control device performs a failure-time AWS control in which the fuel injection valve is caused to collectively inject fuel within the intake stroke, and the ignition timing is set to a timing on an advanced side of the timing for performing the AWS control, and on the retard side of the timing for a case in which the temperature of the catalyst is equal to or greater than the determination catalyst temperature.

2. The combustion control apparatus for an engine according to claim 1, wherein each of the AWS control and the failure-time AWS control is performed when the engine body is in an idling operation.

3. The combustion control apparatus for an engine according to claim 2, wherein the engine body includes a plurality of cylinders, and the control device determines whether a condition that the actual number of times of injection is equal to or less than the determination number of times of injection in a plurality of combustion cycles is respectively established for each of the plurality of cylinders, and when the condition is established for any of the plurality of cylinders, the control device makes a determination for the occurrence of the split injection abnormality, and performs the failure-time AWS control on all of the plurality of cylinders.

4. The combustion control apparatus for an engine according to claim 3, wherein in the failure-time AWS control, the control device causes a start timing of the fuel injection to be advanced more for a case in which a temperature of cooling water for cooling the engine body is low compared with a case in which the temperature of the cooling water for cooling the engine body is high.

5. The combustion control apparatus for an engine according to claim 4, wherein in the failure-time AWS control, the control device causes the ignition timing to be advanced more for a case in which a temperature of cooling water for cooling the engine body is low compared with a case in which the temperature of the cooling water for cooling the engine body is high.

6. The combustion control apparatus for an engine according to claim 3, wherein in the failure-time AWS control, the control device causes the ignition timing to be advanced more for a case in which a temperature of cooling water for cooling the engine body is low compared with a case in which the temperature of the cooling water for cooling the engine body is high.

7. The combustion control apparatus for an engine according to claim 2, wherein in the failure-time AWS control, the control device causes a start timing of the fuel injection to be advanced more for a case in which a temperature of cooling water for cooling the engine body is low compared with a case in which the temperature of the cooling water for cooling the engine body is high.

8. The combustion control apparatus for an engine according to claim 7, wherein in the failure-time AWS control, the control device causes the ignition timing to be advanced more for a case in which a temperature of cooling water for cooling the engine body is low compared with a case in which the temperature of the cooling water for cooling the engine body is high.

9. The combustion control apparatus for an engine according to claim 2, wherein in the failure-time AWS control, the control device causes the ignition timing to be advanced more for a case in which a temperature of cooling water for cooling the engine body is low compared with a case in which the temperature of the cooling water for cooling the engine body is high.

10. The combustion control apparatus for an engine according to claim 1, wherein the engine body includes a plurality of cylinders, and the control device determines whether a condition that the actual number of times of injection is equal to or less than the determination number of times of injection in a plurality of combustion cycles is respectively established for each of the plurality of cylinders, and when the condition is established for any of the plurality of cylinders, the control device makes a determination for the occurrence of the split injection abnormality, and performs the failure-time AWS control on all of the plurality of cylinders.

11. The combustion control apparatus for an engine according to claim 10, wherein in the failure-time AWS control, the control device causes a start timing of the fuel injection to be advanced more for a case in which a temperature of cooling water for cooling the engine body is low compared with a case in which the temperature of the cooling water for cooling the engine body is high.

12. The combustion control apparatus for an engine according to claim 11, wherein in the failure-time AWS control, the control device causes the ignition timing to be advanced more for a case in which a temperature of cooling water for cooling the engine body is low compared with a case in which the temperature of the cooling water for cooling the engine body is high.

13. The combustion control apparatus for an engine according to claim 10, wherein in the failure-time AWS control, the control device causes the ignition timing to be advanced more for a case in which a temperature of cooling water for cooling the engine body is low compared with a case in which the temperature of the cooling water for cooling the engine body is high.

14. The combustion control apparatus for an engine according to claim 1, wherein in the failure-time AWS control, the control device causes a start timing of the fuel injection to be advanced more for a case in which a temperature of cooling water for cooling the engine body is low compared with a case in which the temperature of the cooling water for cooling the engine body is high.

15. The combustion control apparatus for an engine according to claim 14, wherein in the failure-time AWS control, the control device causes the ignition timing to be advanced more for a case in which a temperature of cooling water for cooling the engine body is low compared with a case in which the temperature of the cooling water for cooling the engine body is high.

16. The combustion control apparatus for an engine according to claim 1, wherein in the failure-time AWS control, the control device causes the ignition timing to be advanced more for a case in which a temperature of cooling water for cooling the engine body is low compared with a case in which the temperature of the cooling water for cooling the engine body is high.

* * * * *